United States Patent [19]

McFarland

[11] Patent Number: 5,413,260
[45] Date of Patent: May 9, 1995

[54] CARGO CARRIER FOR A VAN

[76] Inventor: Raymond D. McFarland, 5214 Central College Rd., Westerville, Ohio 43081-9372

[21] Appl. No.: 206,685

[22] Filed: Mar. 7, 1994

[51] Int. Cl.⁶ .............................. B60R 9/06
[52] U.S. Cl. .................. 224/42.03 A; 224/42.42; 224/42.43; 224/42.45 R
[58] Field of Search ............ 224/42.03 R, 42.03 A, 224/42.04, 42.07, 42.08, 42.42, 42.43, 42.44, 42.45 R

[56] References Cited

U.S. PATENT DOCUMENTS

| | | | |
|---|---|---|---|
| 1,232,371 | 7/1917 | Morrison | 224/42.43 |
| 1,778,771 | 10/1930 | Pritchard | 224/42.45 R |
| 2,409,103 | 10/1946 | Cameron | 224/42.03 R |
| 3,273,767 | 9/1966 | Moore | 224/42.08 X |
| 3,437,248 | 4/1969 | Allen | 224/42.03 R |
| 4,728,017 | 3/1988 | Mullican | 224/42.42 |
| 4,809,891 | 3/1989 | Patrin | 224/42.43 |
| 4,907,728 | 3/1990 | Giblet | 224/42.03 A |
| 4,957,228 | 9/1990 | Balka | 224/42.03 A |
| 5,056,695 | 10/1991 | Giblet | 224/42.03 A |
| 5,314,101 | 5/1994 | White | 224/42.03 A |

FOREIGN PATENT DOCUMENTS 2945274  5/1981  Germany .................. 224/42.03 R Primary Examiner—J. Casimer Jacyna
Attorney, Agent, or Firm—James A. Wong

[57] ABSTRACT

A utility cargo carrier attachment fits to the rear of an existing vehicle such as a van. The carrier extends across the entire vehicle width from the rear bumper up to the vehicle roof line. A unique mounting arrangement uses existing rear access doors and existing tow bar structure to rigidly but detachably mount the carrier to the van. The carrier is completely enclosed for cargo protection and is accessible with hinged doors. The interior of the carrier is equipped with shelves to improve space utilization. The entire structure is out of the air stream of the vehicle thus providing excellent fuel efficiency. The weight of the cargo is supported by existing tow bar structure and lateral rigidity is provided by serpentine tee members inserted into existing hinged door cracks. The tees are frictionally engaged in the cracks by the tightening of a securement bolt against a protective resilient pad facing the van exterior. The tees are adjustable on a carrier cross bar to provide for attachment to different sized van doors. A special support fitting is provided for rigid connection to an existing tow bar ball hitch.

7 Claims, 2 Drawing Sheets

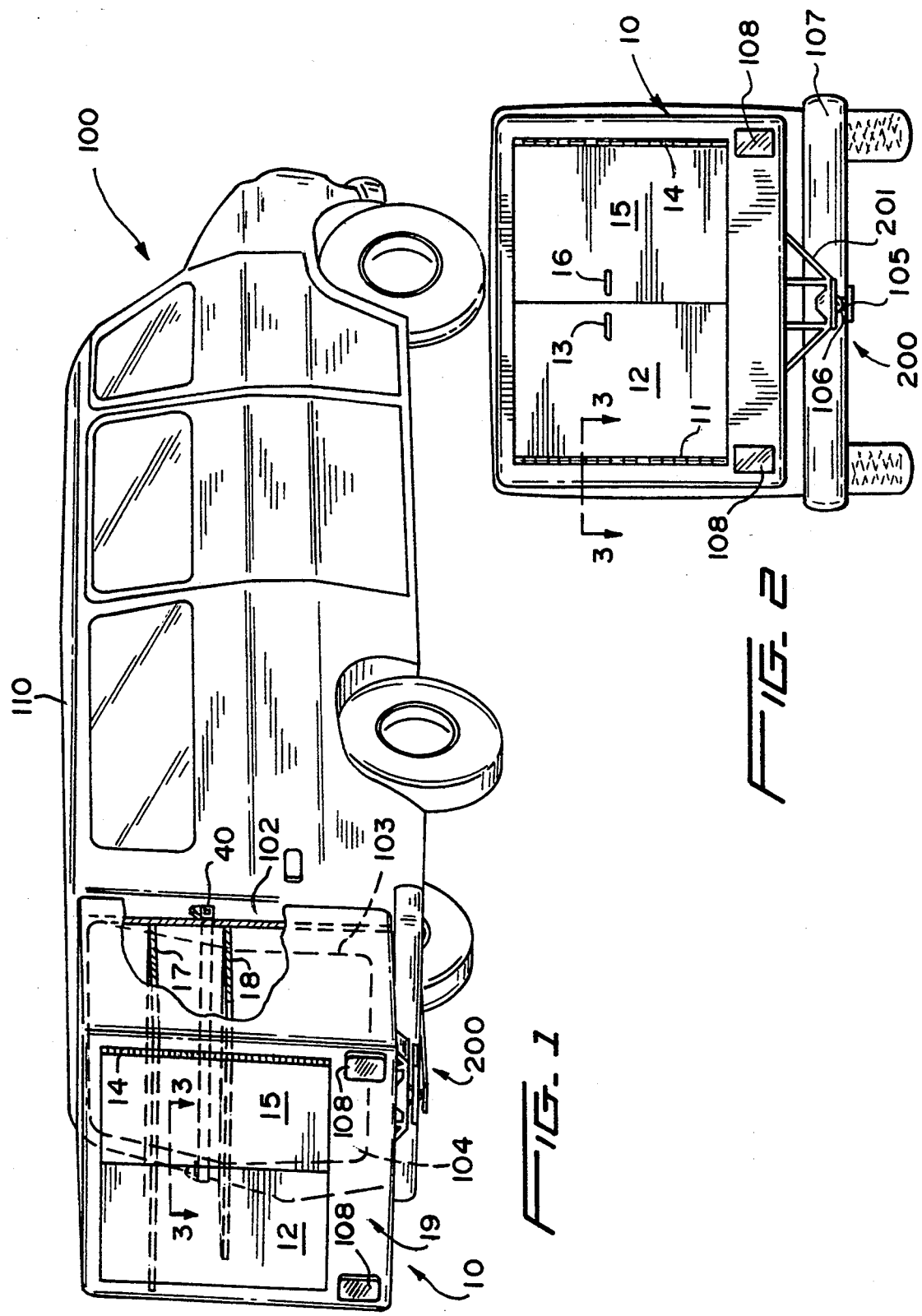

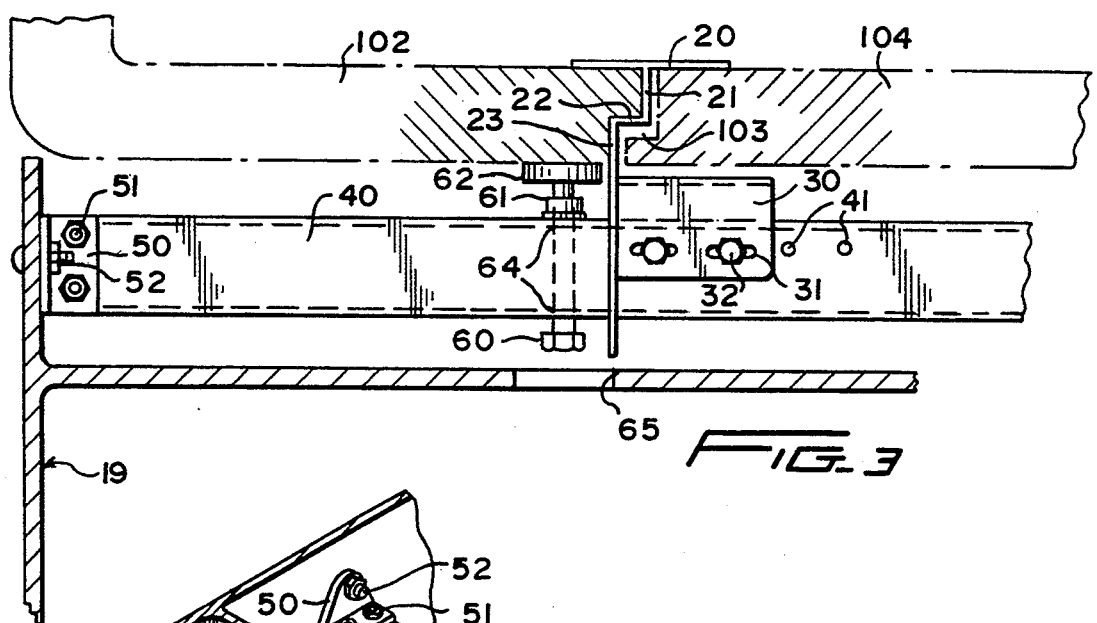
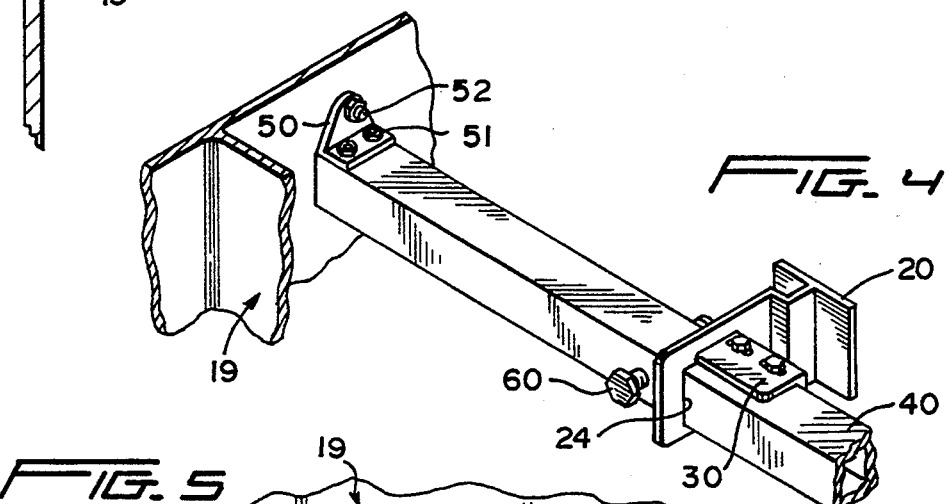
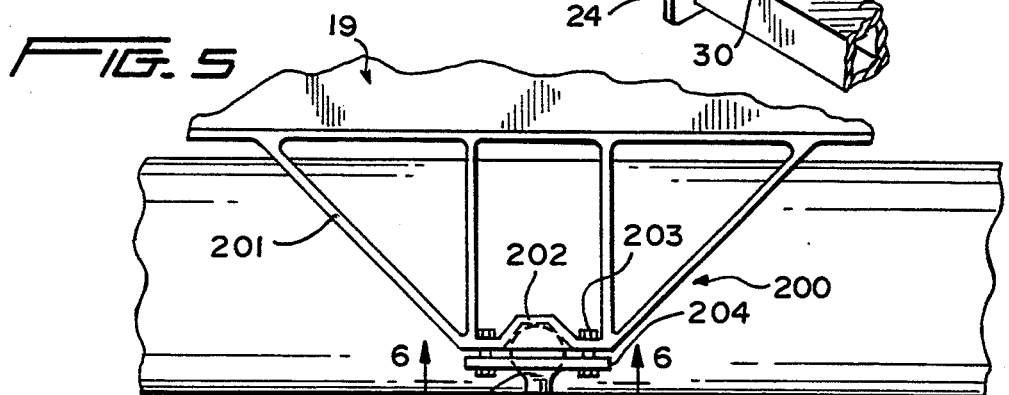
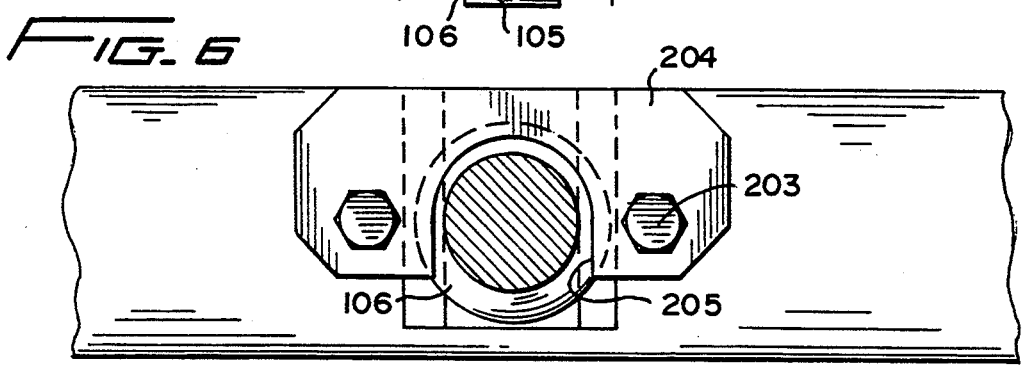

CARGO CARRIER FOR A VAN

BACKGROUND OF THE INVENTION

1. Field of the Invention

The present invention relates to an auxiliary cargo carrying attachment for a vehicle. More specifically, it relates to a cargo carrier for fitting upon the rear of an existing utility van or recreational vehicle. Even more specifically, the invention is an improved rear-mounted cargo carrier for a van that incorporates novel mounting techniques which do not require any permanent alteration of the original vehicle but yet provide a rigid and secure mounting. In general, however, the unique mounting hardware of this invention could be used to hold conveniently and precisely any apparatus to another machine as long as the machine has an openable slot, such as a hinged door crack, to accommodate the unique support tee described herein. For example, the mounting arrangement could conceivably be used to mount a camera on a helicopter or, perhaps, an awning on a store front.

Thus it can be seen that the potential fields of use for this invention are myriad and the particular preferred embodiment described herein is in no way meant to limit the use of the invention to the particular field chosen for exposition of the details of the invention.

A comprehensive listing of all the possible fields to which this invention may be applied is limited only by the imagination and is therefore not provided herein. Some of the more obvious applications are mentioned herein in the interest of providing a full and complete disclosure of the unique properties of this previously unknown general purpose article of manufacture. It is to be understood from the outset that the scope of this invention is not limited to these fields or to the specific examples of potential uses presented hereinafter.

2. Description of the Prior Art

Devices for carrying auxiliary cargo on existing vehicles are old and well known in the art. Many types of camper bodies for pickup trucks have been proposed and manufactured. Recently, recreational vehicles have been developed which can best be described as homes on wheels. The interior of a van is fitted with beds, sofas, tables, chairs, appliances, and other accoutrements associated with human habitation. In accordance with conventional terminology, the term "van" used herein may be taken to mean any full bodied vehicle enclosing a larger space than that necessary to carry the normal driver and passengers. The excess enclosed space may be used for habitation, as in a recreational vehicle, for tools and equipment, as in a utility van, or for transportable goods, as in a delivery van.

No matter what the enclosed space in a van, there always seems to arise the need for more space. The recreational vehicle has most of its interior set aside for human habitation amenities and thus is always critically in need of space for cargo, such as luggage. The utility van has most of its interior set aside for tools and transportable machinery and thus is often in need of additional space for carrying cargo, such as lumber and plumbing accessories. The delivery van has most of its interior set aside for carrying cargo, but the need arises from time to time for carrying that little bit of extra cargo to save two trips to the same area. For example, delivery van fleets might need extra capacity on some vans to handle the extra cargo during a holiday season. Passenger vans, often used in car-pooling, also have critical need for cargo space to carry the personal work equipment of the passengers, such as portable computers, briefcases, books, and papers.

Known prior art has been directed to providing additional cargo space atop a vehicle as with ski racks, etc. Any cargo rack of this type will add appreciably to the wind resistance of the vehicle and substantially reduce the fuel efficiency. By contrast, my invention does not increase the wind resistance of any vehicle because it is attached to the rear and does not increase the frontal area.

Known prior art has provided cargo carrying attachments for carrying tools on existing vehicles. Examples are the tool box attachments commonly seen fitted across the bed of pickup trucks, usually to the rear of the truck cab portion. Although out of the air stream of the vehicle, these suffer from the disadvantage of requiring permanent alteration of the vehicle frame and/or body for attachment. At the very least they require the drilling of mounting bolt holes to affix the box to the bed of the truck. By contrast, my invention requires absolutely no modification or alteration of an existing van to accommodate its rigid but detachable mounting to the van. The ease of attaching and detaching my carrier to a van leads to utility heretofore unknown in the prior art. The carrier may be used as a permanent addition to an existing vehicle or as a temporary addition for meeting temporary needs of one vehicle which may be easily shifted to another vehicle as needs dictate. As will be seen, the simplicity and effectiveness of my invention is not rivaled in the prior art.

SUMMARY OF THE INVENTION

Briefly, the invention comprises a utility cargo carrier attachment for fitting to the rear of an existing vehicle such as a van. The carrier extends across the entire vehicle width from the rear bumper up to the vehicle roof line. A unique mounting arrangement uses existing rear access doors and existing tow bar structure to rigidly but detachably mount the carrier to the van. The carrier is completely enclosed for cargo protection and is accessible with hinged doors. The interior of the carrier is equipped with shelves to improve space utilization. The entire structure is out of the air stream of the vehicle thus providing excellent fuel efficiency. The weight of the cargo is supported by existing tow bar structure and lateral rigidity is provided by serpentine tee members inserted into existing hinged door cracks. The tees are frictionally engaged in the cracks by the tightening of a securement bolt against a protective pad on the van exterior. The tees are adjustable on a carrier cross bar to provide for attachment to different sized van doors. A special support fitting is provided for rigid connection to an existing tow bar ball hitch.

Accordingly, it is a principal object of the invention to provide a new and improved cargo carrier for a van which overcomes the disadvantages of the prior art in a simple but effective manner.

It is a major object of this invention to provide a cargo carrier which does not increase the frontal area of the van and actually serves to improve fuel efficiency by reducing turbulent air flow behind the van.

It is another object of the invention to provide a cargo carrier for a van which is large in size, extending substantially across the entire width and height of the rear of the van.

It is another object of the invention to provide a cargo carrier for a van which may be quickly and rigidly mounted to the van without the necessity of any alterations to the existing van structure.

It is another object of the invention to provide a cargo carrier for a van which may be quickly and easily disconnected from the van for storage or mounting to another vehicle.

It is another object of the invention to provide a cargo carrier for a van which may be quickly and easily adjusted to fit vans of various sizes and shapes.

It is another object of the invention to provide a cargo carrier for a van which supports weight forces by attachment to the vehicle frame through existing tow bar structure.

It is another object of the invention to provide a cargo carrier for a van which firmly resists lateral forces with frictionally engaged serpentine tees fitting into existing van door cracks.

It is another object of the invention to provide a cargo carrier for a van which is fully enclosed for cargo security and protection.

It is another object of the invention to provide a cargo carrier for a van with large cargo access doors for easy ingress to the cargo.

It is another object of the invention to provide a cargo carrier for a van with interior shelves for efficient storage of diverse cargo.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 1 is an environmental perspective view of a van with the inventive cargo carrier, shown partially broken away, mounted on the rear.

FIG. 2 is a rear view of the invention mounted on a van showing the large cargo access doors and the tow bar support placement beneath the carrier.

FIG. 3 is a cross-sectional view taken generally along arrows 3—3 of FIGS. 1 and 2, and showing details of the carrier mounting as seen from above.

FIG. 4 is a perspective view with portions of the carrier housing broken away showing further details of the carrier mounting.

FIG. 5 is a rear elevational view showing the tow bar mounting bracket of the cargo carrier and ball hitch attachment means.

FIG. 6 is a cross sectional view taken along line 6—6 of FIG. 5 and looking upward at the ball hitch locking plate of the invention.

DETAILED DESCRIPTION OF THE PREFERRED EMBODIMENT

The cargo carrier of the present invention is generally designated by arrow 10 of FIG. 1 where it is shown attached to the rear of a conventional van 100. The device comprises the following main parts; carrier 10 including frame and housing 19, upper support bar 40, and lower tow bar support 200.

Referring first to FIGS. 1 and 3, there is seen a vehicle or van 100 with a conventional body construction. The rear wall 102 of the van body is fitted with dual rear doors 104 with a normal crack or small clearance 103 surrounding the doors. The dual rear doors of the van shown here are swung about hinges along the outer edges so as to open from the middle outward. It is noted that this invention would work just as well with a single rear van door that is hinged to swing outwardly from the top in "hatch back" fashion as is common in current vans and station wagons. The carrier of this invention fits over the rear doors and utilizes a portion of the clearance crack for support tees as described later. The rear doors are not operative when the carrier of this invention is installed over them. As is clear from FIGS. 1 and 2 the carrier 10 of this invention is quite large. It extends the full width of van 10 from the rear bumper 107 to the roof line 110 of the vehicle. Since a carrier of this size could easily cover up the existing vehicle tail lights, auxiliary tail lights 108 are provided on the carrier.

The housing and frame 19 of carrier 10 contains its own cargo doors 12 and 15 at the rear. Side hinges 11 and 14 are used to swing cargo doors 12 and 15 outwardly from the middle in the preferred embodiment. Of course any other form of cargo access door might be employed, such as swing-up or a drop-down single door. FIG. 2 shows the rear of carrier 10 with the preferred double doors having handles 13 and 16 for opening them. Handles, latches, locks, windows, and other conventional door hardware are all easy to put on the cargo doors and well within the realm of the artisan. Such minor modifications are not further discussed here.

Seen through the broken away side wall of the cargo carrier (FIG. 1) are interior shelves or racks 17 and 18. It is contemplated that any conventional interior hardware for the cargo container, such as shelves, hangers, receptacles, hooks, and rails, can be added as desired. Such minor modifications are not further discussed here.

Also seen in FIGS. 1 and 2 is the lower tow bar support structure indicated generally at 200. Note the lower support structure provides single point support beneath carrier 10 at a central point approximately under the center of gravity of the cargo carrier and its load. Support structure 200 is designed to be firmly attached to hitch ball 106 on conventional tow bar 105. Further details of lower support structure 200 are given later in reference to FIGS. 5 and 6.

The single point bottom support provided by the tow bar mounted hitch ball 106 is sufficient to easily support the weight of carrier 10 and its cargo because the tow bar is strongly attached directly to the vehicle frame near the rear of the vehicle. However, there must be additional support for the rear mounted carrier 10 to prevent any rotation about this single support point. This additional support is provided by support bar 40 the end of which is just visible in FIG. 1 and the details of which are shown in FIGS. 3 and 4.

Turning now to FIGS. 3 and 4, support bar 40 is shown as an intermediate support member connected on the one hand to van body 102 and on the other hand to carrier frame 19. A typical clearance gap or crack 103 between van body 102 and van rear door 104 is shown in FIG. 3. Note the jog or offset in the clearance gap partway through the door thickness. Support tee 20 is formed with standard flat top or head portion for fitting the inside surface of van body 102 on one side and rear door 104 on the other side. The leg of the tee extends into the clearance gap 103 between van body 102 and door 104. The leg of the tee is not standard, however, and is bent in a serpentine fashion so as to match the contours of the jog or offset in the clearance gap 103. Section 21 runs in the direction of a normal tee. Section 22 takes a 90 degree sideways jog and section 23 is bent so as to be parallel to but offset from section 21. The final support tee section 23 is long enough to extend an appreciable distance rearward of van door 104 and deep enough to provide room for aperture 24 (FIG. 4) which surrounds cross support bar 40.

Support bar 40 extends laterally from one side of the van to the other across the entire width of the cargo carrier. FIGS. 3 and 4 show just the left side of the support bar for clarity. It is to be understood that similar mounts and hardware are present on the unshown right side of bar 40. Support bar 40 is formed from rectangular steel tubing in the preferred embodiment; but circular pipe, or any other rod-like material, could be used.

Support angle 30 is bolted to support bar 40 at any of several mounting hole locations 41 by bolts 32. Support angle 30 has elongated slots for bolts 32 to allow for fine lateral adjustment of the support angle on the support bar. In use, support bar 40 is passed through aperture 24 in tee leg 23. The lateral motion of the support bar through aperture 24 is stopped by the presence of angle 30 on the support bar. The adjustable location of angle 30 (via slots 31 and multiple holes 41) on support bar 40 thus provides for lateral adjustment of the support bar with respect to the tees and thus the van.

Each end of support bar 40 is fitted with side attachment 50 for rigidly securing the frame structure 19 of cargo carrier 10 to support bar 40. Angled side attachment 50 is shown attached to the support bar end by bolts 51 and to the carrier by bolt 52. Of course the artisan will recognize many equivalent methods of rigidly securing a bar end to a plate or frame member such as 19 of FIGS. 3 and 4. Thus, if support bar 40 can be rigidly affixed to the rear of van 100, carrier 10 will also be so rigidly affixed. As described so far, however, support bar 40 is not rigidly affixed to van 100 because it is possible for serpentine tee 20 to slide up and down in clearance gap 103 thus allowing movement of carrier 10 with respect to van 100. The structure about to be described will firmly affix tee 20 in gap 103.

Near each end of support bar 40 horizontal through bores 64 are provided to allow the passage of a pressure bolt 60. Welded or otherwise affixed to the front surface of bar 40 is nut 61 which is suitably threaded to receive bolt 60. Resilient pressure pad 62 is disposed between the end of bolt 60 and the outer surface of van body rear 102. As bolt 60 is screwed through nut 61 it compresses pad 62 against body 102 and tends to force support bar 40 and attached carrier 10 away from the van rear. However, attached tee head portion 20 is constrained from moving away from the van by virtue of its being captured against the inner surfaces of van body rear 102 and van rear door 104. As a result of this, tension is developed in tee leg 21 and thereby substantially increasing the normal force exerted by the van parts on tee head portion 20. By virtue of this large normal force the associated frictional force is more than sufficient to prevent any movement of the captured serpentine tee. The main purpose of pad 62 in this operation is to prevent marring of the exterior surfaces of van body rear 102 and rear door 104. To allow easy access to tighten bolt 60, it should be noted that access hole 65 may be formed in the frame or body 19 of carrier 10. The access hole 65 may be suitably sealed with a plastic plug (not shown) if desired. Of course the artisan will recognize many other equivalent methods of wedging support bar 40 away from the van rear and thus tensioning tees 20 into solid frictional engagement. The artisan will also recognize that some sort of protective pad may also be employed between tee head portion 20 and the interior surfaces of the van.

The bottom weight support structure 200 will now be described with respect to FIGS. 5 and 6. FIG. 5 is a rear view, looking forward, of the bottom support structure. Lower support frame 201 is rigidly attached, as by welding, at its upper end to carrier framework 19. Frame 201 may be cast as a single unitary piece or consist of several welded pieces. In either case support frame 201 is wide at the top, to provide a broad support base for carrier framework 19, and tapers inwardly toward the bottom center, to provide single point support from tow hitch ball 106. The tow hitch ball 106 is secured to tow bar 105 which, in turn, is secured to the vehicle frame (not shown). Ball recess 202 of the bottom portion of frame 201 accommodates and is seated on top of ball 106. Recess 202 may be appropriately machined to match the curvature of the upper portion of ball 106. There are holes for securement bolts 203 on each side of ball recess 202. Bolts 203 are used to draw slotted securement plate 204 firmly up against the lower portion of ball 106. Securement plate 204, best seen in FIG. 6, has a slot 205 for fitting around ball 106 and a bolt hole on each side of the slot. The width of slot 205 is less than the diameter of ball 106 and may be appropriately chamfered to match the curvature of the ball. During installation of carrier 10 frame 201 is set atop ball 106. Slot 205 of plate 204 is then slipped around lower surface of ball 106. Bolts 203 are then passed through the aligned holes in frame 201 and plate 204 and tightened. This securely attaches frame 201 and carrier 10 to ball 106 and the vehicle frame. The artisan will recognize many other equivalent ways of securing a recessed frame to a ball hitch. It is contemplated that frame 201 could also be attached directly to tow bar 105 if desired.

It is to be understood that the provided illustrative examples are by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily determine how to attach my rear mounted carrier to a hatch back type vehicle with a vertically swinging rear door.

It is to be understood that the present invention is not limited to the sole embodiment described above, but encompasses any and all embodiments within the scope of the following claims:

I claim:

1. A cargo carrier for a vehicle comprising:
   (a) a carrier housing member extending substantially across the width of the vehicle from a rear bumper on the vehicle to the roof line of the vehicle;
   (b) connecting means for rigidly attaching said carrier housing member to the rear of said vehicle without the necessity of altering the vehicle in any way, wherein said connecting means comprises weight support means for supporting a bottom portion of said housing member from an existing tow hitch bar on the vehicle, lateral support means for preventing rotation of said cargo carrier about the tow hitch bar, said lateral support means including tee brackets with head portions flush with the interior of the vehicle and with leg portions fitting through the contours of an existing door crack and extending rearwardly of the vehicle, said rearwardly extending part of said leg portion of each of said tee brackets having an aperture extending therethrough, and a horizontal carrier cross bar secured at both ends to said cargo carrier and passing through said apertures in each of said tee brackets; and
   (c) pressure application means connected to said cross bar for generating a force tending to rotate said carrier about said weight support means away from said vehicle body;
   wherein generation of said force by said pressure application means pulls said head portions of said tee brackets against the interior of the vehicle with sufficient force to prevent any motion of said tee brackets in the door crack, and said cross bar, being surrounded by said apertures, is prevented from motion by said apertures.

2. The cargo carrier of claim 1 wherein said vehicle is a van.

3. The cargo carrier of claim 1 wherein said housing member includes hinged cargo access doors.

4. The cargo carrier of claim 3 wherein the interior of said housing member includes cargo separation means.

5. The cargo carrier of claim 4 wherein said cargo separation means comprises at least one interior shelf.

6. The cargo carrier of claim 1 wherein said lateral support means further comprises;
   adjustable stop means for preventing sliding of said carrier cross bar through said apertures and providing the ability to adjust said lateral support means to accommodate various distances between the door cracks on the vehicle and thereby provide for mounting said cargo carrier on different vehicles.

7. The cargo carrier of claim 1 wherein said pressure application means comprises;
   pressure bolt means threaded through nuts secured near each end of said cross bar; and
   resilient pad means to prevent the pressure bolt means from marring the exterior surface of the vehicle as said pressure bolt means are tightened.

* * * * *